United States Patent [19]

Tanjo

[11] Patent Number: 4,717,938
[45] Date of Patent: Jan. 5, 1988

[54] PAPER TRANSFERRING APPARATUS FOR A COPYING MACHINE

[75] Inventor: Toru Tanjo, Toyonaka, Japan

[73] Assignee: Mita Industrial Co., Ltd., Osaka, Japan

[21] Appl. No.: 929,995

[22] Filed: Nov. 13, 1986

[30] Foreign Application Priority Data

Nov. 15, 1985 [JP] Japan .................................. 60-257260

[51] Int. Cl.[4] ............................................. G03G 15/00
[52] U.S. Cl. .................................. 355/3 SH; 29/121.1; 271/161; 271/188; 355/3 R; 355/14 SH
[58] Field of Search ............... 355/3 R, 3 SH, 14 SH; 271/161, 188, 209; 198/813; 29/121.1, 122

[56] References Cited

U.S. PATENT DOCUMENTS

| 1,317,713 | 10/1919 | Linder | 29/122 |
| 2,732,591 | 1/1956 | Whittum | 29/122 |
| 3,884,623 | 5/1975 | Slack | 219/469 X |
| 3,984,183 | 10/1976 | Maksymiak | 355/3 R X |

FOREIGN PATENT DOCUMENTS 3108095 10/1982 Fed. Rep. of Germany ... 355/3 FU
54-163040 12/1979 Japan .................................. 355/3 R
59-137975 8/1984 Japan .................................. 355/3 FU Primary Examiner—Arthur T. Grimley
Assistant Examiner—Jane K. Lau
Attorney, Agent, or Firm—Stiefel, Gross, Kurland & Pavane

[57] ABSTRACT

The present invention is of a paper transferring apparatus for a copying machine which consists of a pair of upper and lower resist rollers and a pair of upper and lower pre-transfer rollers located at a photoreceptor-drum side from these resist rollers, and the upper roller out of the paired upper and lower resists rollers has a substantially larger roller diameter at the center part in the axial direction of the roller in comparison with that at the both ends, and the lower roller thereof has a uniform roller diameter throughout the roller, and the upper roller out of the paired upper and lower pre-transfer rollers has a substantially smaller roller diameter at the center part in the axial direction of the roller in comparison with that at the both end parts, and the lower roller thereof has a uniform roller diameter throughout the roller.

12 Claims, 6 Drawing Figures

PAPER TRANSFERRING APPARATUS FOR A COPYING MACHINE

FIELD OF THE INVENTION

The present invention relates to a paper transferring apparatus for a copying machine, and specifically, the present invention relates to improved construction of a pair of resist rollers and a pair of pre-transfer rollers which are installed in a copying machine main unit to transfer a copy paper to a photoreceptor-drum.

RELATED ART STATEMENT

A pair of resist rollers employed for a paper transferring apparatus for a copying machine must stop a copy paper quickly, bend it, correct the timing of the tip of the copy paper and correct the attitude of the copy paper obliquely transferred, and thereafter transfer the copy paper to the pre-transfer rollers side in matching with the timing of an optical system. However, since the resist rollers have to reliably stop the copy paper quickly, strong springs are provided which are set at the ends of the paired upper and lower rollers. To prevent a reduction in the roller pressure produced between the center parts of the upper and lower rollers by the springs, the upper roller is formed nearly in a drum shape (the roller diameter at the center part in the axial direction of the roller is larger than that at the both sides thereof).

Thus, as to the resist rollers, the upper roller is formed nearly in a drum shape to prevent a partial reduction in the pressure by the upper and lower rollers, and thus, because the roller diameter at each part is set differently, the peripheral speed of each part of the roller differs, causing "wrinkling" of the paper. Specifically, the peripheral speed of the upper roller of the resist rollers is larger at the center part of the roller (in the axial direction of the roller), and is smaller at the both end parts. Accordingly, "wrinkling" is likely to take place at both ends of the paper and particularly with a thin copy paper, large-sized copy paper or the like.

SUMMARY OF THE INVENTION

In accordance with the present invention, a paper transferring apparatus for a copying machine is provided, which is installed in a copying machine main unit to transfer a copy paper to a photoreceptor-drum and which consists of a pair of upper and lower resist rollers and a pair of upper and lower pre-transfer rollers located at the photoreceptor-drum side from these resist rollers, wherein the upper roller out of the paired upper and lower resist rollers has a substantially larger roller diameter at the center part in the axial direction of the roller in comparison with that at the both end parts, and the lower roller thereof has a uniform roller diameter throughout the roller, and the upper roller out of the paired upper and lower pre-transfer rollers has a substantially smaller roller diameter at the center part in the axial direction of the roller in comparison with that at the both end parts, and the lower roller has a uniform roller diameter throughout the roller.

This means that the present invention is such that, contrary to the resist rollers, the upper roller of the pre-transfer rollers installed between the photoreceptor-drum and the resist roller has a substantially smaller roller diameter at the center part in the axial direction of the roller in comparison with that at the both ends. That is, it is formed in a reverse-drum shape, and thereby the partial difference in the peripheral speed of the roller caused by the drum shape of the upper roller of the resist rollers is eliminated, resulting in preventing the copy paper from "wrinkling".

In the present invention, as to the upper roller of the resist rollers, that the roller diameter at the center part in the axial direction of the roller is substantially larger in comparison with that at the both end parts means that the roller diameter is set so as to differ between the center part and the both end parts to the extent that a reduction in the roller pressure produced between the center parts of the upper and lower rollers by the springs set at the end parts of the paired upper and lower resist rollers can be prevented. For example, the roller diameter at the center part of the upper roller is set to be 0.05–0.3 mm and preferably 0.05–0.15 mm larger than that at the both end parts. A difference in the roller diameter at each part of the upper roller of the resist rollers as described above causes a difference in the peripheral speed of each part of the upper roller. Thus, the copy paper transferred to the pre-transfer rollers has a different speed at each part.

On the other hand, as to the upper roller of the pre-transfer rollers, that the roller diameter at the center part in the axial direction of the roller is substantially smaller in comparison with that at the both end sides means that the roller diameter of the upper roller of the pre-transfer rollers is set so as to differ at each part to the extent that the difference in the peripheral speed of the roller caused by such a difference in the roller diameter between the both parts of the upper roller of the pre-transfer rollers reduces the difference in the speed of the above-described copy paper transferred from the resist rollers and thereby wrinkling of the copy paper can be prevented.

The roller diameter at the center part of the upper roller of the pre-transfer roller is set to be preferably 0.05–0.3 mm and more preferably 0.05–0.15 mm smaller than that at the both end parts.

It is desirable that the upper roller of the resist rollers and the upper roller of the pre-transfer rollers have substantially the same difference between the roller diameter at the center part in the axial direction of the roller and that at both ends.

Any copy paper which can be used for normal copying machines can be used with the present invention without special limitations, but in the case where the above-described difference in the roller diameter of each roller is set at a large value, a thick paper is desirably used for the copy paper. In the case where the difference is set at a small value, a thin paper is desirably used. For example, the thickness of general copy paper corresponds to 50–100 g/m$^2$ and the thickness of thin copy paper corresponds to 64 g/m$^2$ or less. Accordingly, in the case where a copy paper having a thickness corresponding to 64 g/m$^2$ or less is used, the above-described difference in the diameter of each upper roller of the resist rollers and the pre-transfer rollers is desirably set at a small value.

DESCRIPTION OF THE PREFERRED EMBODIMENTS

Figure 2:
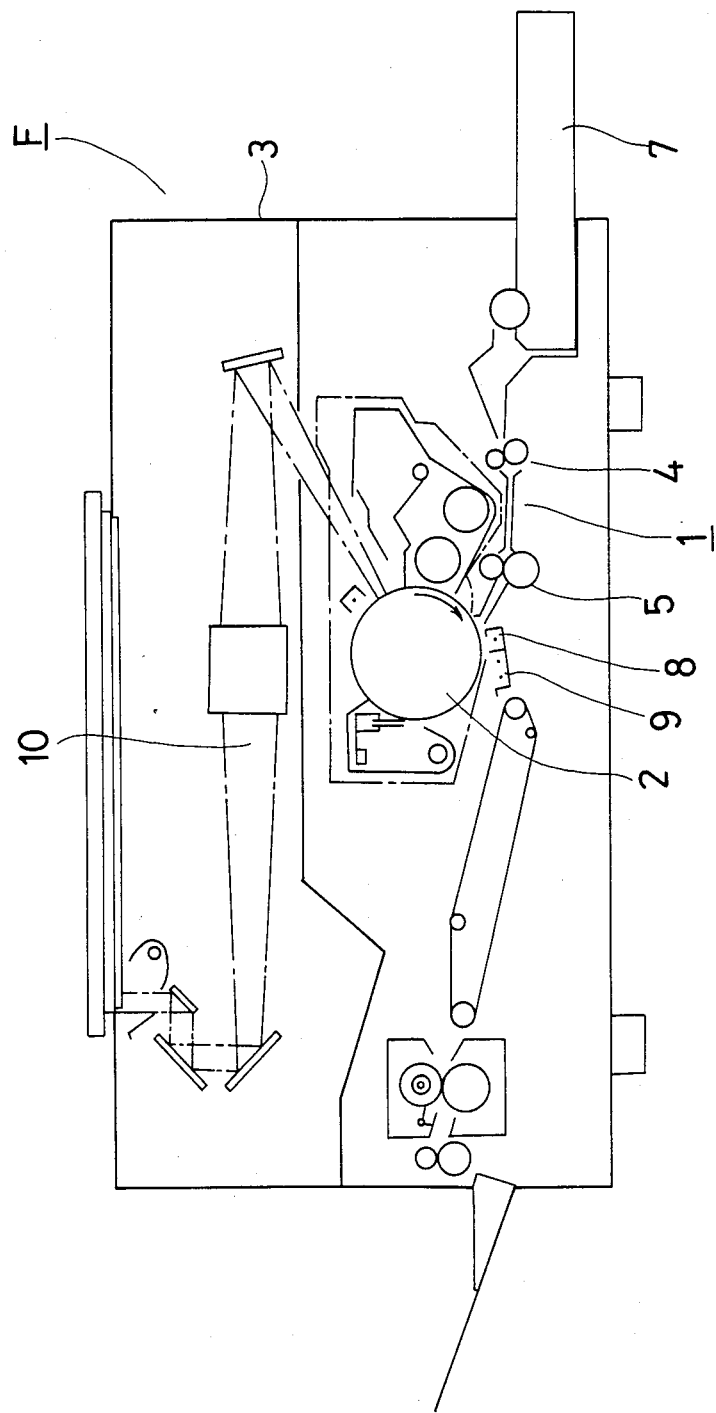
FIG. 2 is an explanatory view of a whole configuration of a copying machine showing positions where these rollers are installed, FIGS. 3(A) and (B) are explanatory views of major parts showing another embodiment of an upper roller of resist rollers, and FIGS. 4(A) and (B) are explanatory views of major parts showing another embodiment of an upper roller of pre-transfer rollers.

In FIG. 2, a paper transferring apparatus 1 for a copying machine F comprises resist rollers 4 installed in a copying machine main unit 3 to transfer a copy paper to a photoreceptor-drum 2 and pre-transfer rollers 5 located between these resist rollers and the photoreceptor-drum 2. In addition, numeral 7 designates a copy paper feeding cassette, numeral 8 designates a transferring charger, numeral 9 designates a separating charger and numeral 10 designates an optical system for projecting an image of an original.

Figure 1:
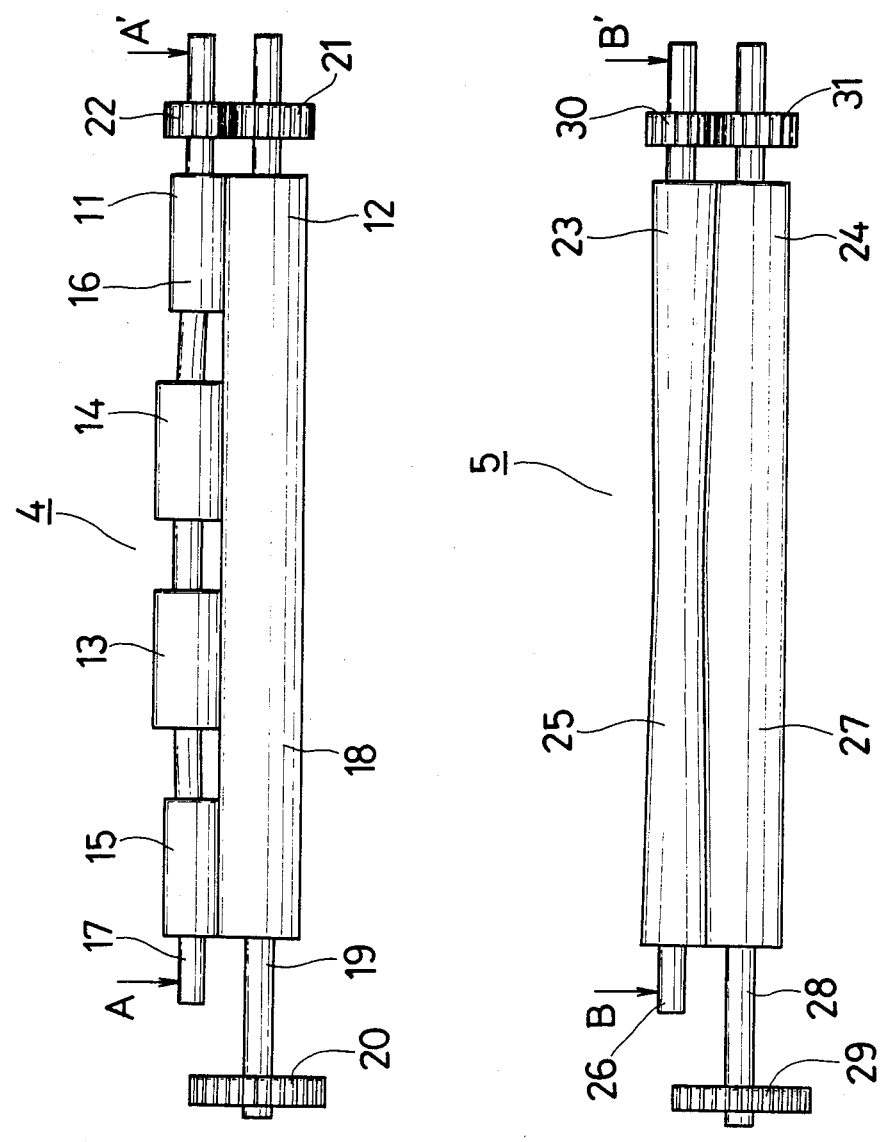
FIG. 1 is an explanatory view of major parts of resist rollers and pre-transfer rollers showing one embodiment in accordance with the present invention.

With reference to FIG. 1, the resist rollers 4 consist of an upper roller 11 and a lower roller 12, and the upper roller 11 is composed of two center roller parts 13 and 14 having larger diameters, both end roller parts 15 and 16 having smaller diameters and a roller shaft 17 supporting these rollers. The surface of each roller is made of (elastic) rubber. Lower roller 12 has a uniform diameter, and consists of a roller part 18 whose surface is formed by a hard synthetic resin, for example, Duracon (registered trade mark), and a roller shaft 19. In addition, numeral 20 designates a gear of driving side and numerals 21 and 22 designate gears of driving force transmitting side. Strong forces as shown by arrows A and A' are applied to the both ends of the roller shaft 17 of the upper roller 11 toward the lower roller 12 by means of springs (illustration is omitted).

Next, the pre-transfer rollers 5 consists of an upper roller 23 and a lower roller 24. Upper roller 23 consists of a steel core 25 of the roller part whose diameter is reduced gradually from the both end parts toward the center part and whose surface is coated with a hard synthetic resin, and a roller shaft 26. Lower roller 24 has a uniform diameter and consists of a roller part 27 whose surface is made of (elastic) rubber and a roller shaft 28. In addition, numeral 29 designates a gear of driving side and numerals 30 and 31 designate gears of driving force transmitting side. Strong forces as shown by arrows B and B' are applied to both ends of the roller shaft 26 of the upper roller 23 toward the lower roller 24 by means of springs (illustration is omitted).

Thus, as to the resist rollers 4, the center roller parts 13 and 14 of the upper roller 11 have larger diameters in comparison with those of the both end roller parts 15 and 16. Therefore the center part of the copy paper is about to be transferred at a higher speed and both end parts thereof are about to be transferred at a lower speed, but because the pre-transfer roller 5 has a smaller diameter at the center part of the roller part 25 of the upper roller 23 and a larger diameter at both end parts thereof, the difference in the transferring speed given to the copy paper becomes the reverse of that imparted by the resist rollers 4. As a result, both differences cancel and the copy paper is transferred nearly at a uniform speed across the whole width thereof, thereby preventing "wrinkling".

Following are typical sizes for each roller shown in FIG. 1. The thickness of the copy paper to be used corresponds to 55 g/m².

Upper roller 11 of resist rollers 4
Outer diameter:
Center roller parts 13 and 14: 16.6 mmφ
Both end roller parts 15 and 16: 16.5 mmφ
(Difference between roller diameters of both parts: 0.1 mm)
Lower roller 12 of the same
(High speed mode: peripheral speed, 350 mm/s
Low speed mode: peripheral speed, 245 mm/s
Outer diameter:
Roller part 18: 23.87 mmφ
Upper roller 23 of pre-transfer roller 5
Outer diameter:
Center roller part 25: 16.5 mmφ
Both end roller parts: 16.6 mmφ
(Difference between roller diameters of both parts: 0.1 mm)
Lower roller 24 of the same
(High speed mode: peripheral speed, 350 mm/s
Low speed mode: peripheral speed, 245 mm/s
Outer diameter:
Roller part 27: 23.87 mmφ

Figure 3:
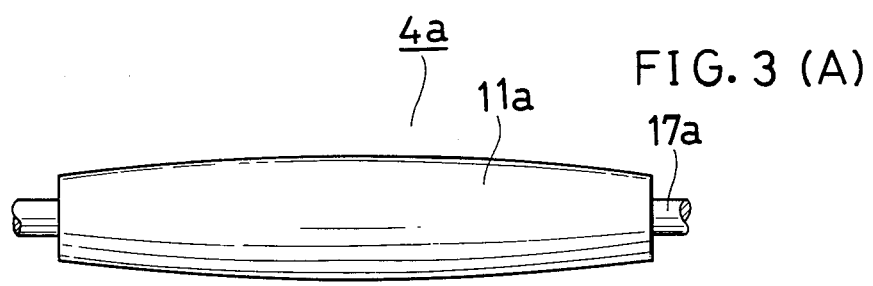
Figure 3:
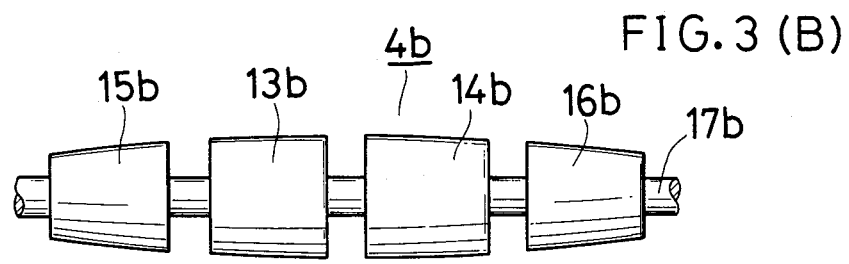
Figure 4:
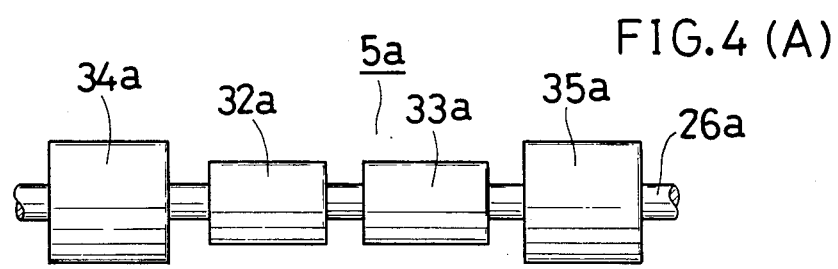
Figure 4:
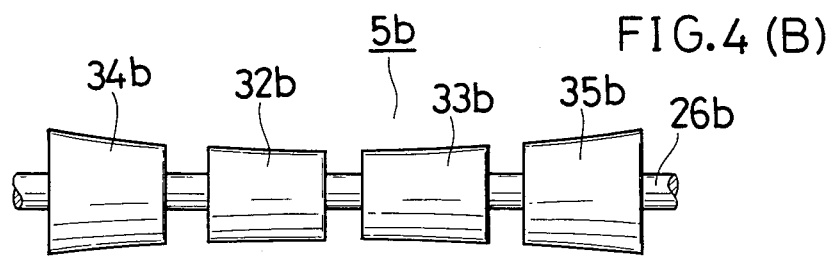

Alternatively, the upper roller of the resist rollers may be constituted in a manner such that, as shown in FIG. 3(A), the diameter of the roller part (11a) is increased gradually and continuously from the both end parts toward the center part. Needless to say, this upper roller may be constituted with intermittent roller parts 13b, 14b, 15b and 16b as shown in FIG. 3(B).

The upper roller of the pre-transfer rollers may provide center roller parts 32a and 33a having smaller diameters and both end roller parts 34a and 35a having larger diameters. Each roller part 32b, 33b, 34b and 35b may be formed in a manner that the diameter thereof is reduced gradually from the both end parts toward the center part.

What is claimed is:

1. A paper transferring apparatus for a copying machine comprising a pair of upper and lower resist rollers installed in a copy machine main unit to transfer a copy paper to a photoreceptor-drum and a pair of upper and lower pre-transfer rollers located at the photoreceptor-drum side from said resist rollers, wherein the upper roller out of the paired upper and lower resist rollers has a substantially larger roller diameter at the center part in the axial direction of the roller in comparison with that at the both end parts, and the lower roller has a uniform roller diameter throughout the roller, and the upper roller out of the paired upper and lower pre-transfer rollers has a substantially smaller roller diameter at the center part in the axial direction of the roller in comparison with that at the both end parts, and the lower roller has a uniform roller diameter throughout the roller.

2. A paper transferring apparatus in accordance with claim 1, wherein the upper roller of the resist rollers has a roller diameter at the central part in the axial direction of the roller 0.05–0.3 mm larger than that at the both end parts, and the upper roller of the pre-transfer rollers has a roller diameter at the center part in the axial direction of the roller 0.05–0.3 mm smaller than that at the both end parts.

3. A paper transferring apparatus in accordance with claim 2, wherein the upper roller of the resist rollers and the upper roller of the pre-transfer rollers have substantially the same difference between the roller diameter at the center part in the axial direction of the roller and that at the both ends.

4. A paper transferring apparatus in accordance with claim 3, wherein the upper roller of the resist rollers and the upper roller of the pre-transfer rollers have a difference of 0.05–0.15 mm between the roller diameter at the center part in the axial direction of the roller and that at the both ends.

5. A paper transferring apparatus in accordance with claim 4, wherein the upper roller of the resist rollers and the upper roller of the pre-transfer rollers have a difference of 0.1 mm between the roller diameter at the center part in the axial direction of the roller and that at the both end parts.

6. A paper transferring apparatus in accordance with claim 4, wherein the thickness of copy paper corresponds to 64 g/m$^2$ or less.

7. A paper transferring apparatus in accordance with claim 1, wherein the upper roller of the resist rollers and/or of the pre-transfer rollers comprises a roller shaft and a plurality of axially spaced apart roller parts supported by the roller shaft.

8. A paper transferring apparatus in accordance with claim 7, wherein each roller part has a uniform roller diameter.

9. A paper transferring apparatus in accordance with claim 7, wherein the upper roller of the resist rollers comprises a roller shaft and a plurality of axially spaced apart roller parts supported by the roller shaft and the diameter of each roller part is gradually increased from both end parts of the upper roller toward the center part thereof in the axial direction of the roller.

10. A paper transferring apparatus in accordance with claim 7, wherein the upper roller of the pre-transfer rollers comprises a roller shaft and a plurality of axially spaced apart roller parts supported by the roller shaft and the diameter of each roller part is gradually reduced from both end parts of the upper roller toward the center part thereof in the axial direction of the roller.

11. A paper transferring apparatus in accordance with claim 1, wherein the upper roller of the resist rollers and/or of the pre-transfer rollers comprises a roller shaft and one roller part which is supported by the roller shaft and whose diameter is varied gradually and continuously throughout the roller part.

12. A paper transferring apparatus in accordance with claim 7, wherein the upper roller of the resist rollers comprises a roller shaft and a plurality of axially spaced apart roller parts supported by the roller shaft and each roller part has a uniform roller diameter, and the upper roller of the pre-transfer rollers comprises a roller shaft and one roller part which is supported by the roller shaft and whose diameter is reduced gradually and continuously from both end parts of the upper roller toward the center part thereof in the axial direction of the roller throughout the roller part.

* * * * *